(12) United States Patent
Howell (10) Patent No.: US 9,245,381 B2
(45) Date of Patent: Jan. 26, 2016

(54) VISUAL DISTORTION EFFECTS THROUGH TRANSLUCENT STRUCTURES IN DESIGN SOFTWARE

(71) Applicant: ICE Edge Business Solutions, Ltd., Calgary (CA)

(72) Inventor: Joseph S. Howell, Uintah, UT (US)

(73) Assignee: ICE EDGE BUSINESS SOLUTIONS, LTD, Calgary (CA)

( * ) Notice: Subject to any disclaimer, the term of this patent is extended or adjusted under 35 U.S.C. 154(b) by 0 days.

(21) Appl. No.: 14/111,669

(22) PCT Filed: Jan. 31, 2013

(86) PCT No.: PCT/US2013/024063
§ 371 (c)(1),
(2) Date: Oct. 14, 2013

(87) PCT Pub. No.: WO2014/120185
PCT Pub. Date: Aug. 7, 2014

(65) Prior Publication Data
US 2014/0362075 A1 Dec. 11, 2014

(51) Int. Cl.
*G06T 15/00* (2011.01)
*G06T 17/00* (2006.01)
*G06T 19/20* (2011.01)

(52) U.S. Cl.
CPC ............... *G06T 17/00* (2013.01); *G06T 19/20* (2013.01); *G06T 2210/04* (2013.01); *G06T 2210/62* (2013.01); *G06T 2219/2012* (2013.01)

(58) Field of Classification Search
CPC .... G06F 17/50; G06F 3/0481; G06F 17/5004
USPC ........................................................ 345/419
See application file for complete search history.

(56) References Cited

U.S. PATENT DOCUMENTS 3,972,163 A  8/1976  Coperthwaite
4,207,714 A  6/1980  Mehls
(Continued)

FOREIGN PATENT DOCUMENTS

JP     02039377    2/1990
JP    2000132706   5/2000
(Continued)

OTHER PUBLICATIONS

CG Blog; "Photoshop tutorial and Post-producted glasses"; captured Jan. 6, 2011; www.grafica3dblog.it/photoshop_tutorial_glass.htm; pp. 1-7.*
(Continued)

*Primary Examiner* — Peter Hoang
(74) *Attorney, Agent, or Firm* — Workman Nydegger (57) ABSTRACT

System, methods, and apparatus allow for creating translucent surfaces within a three-dimensional model. One or more implementations render a three-dimensional model of a layout of a design space within an architectural design environment. Additionally, one or more implementations identify a first portion of the three-dimensional model that is positioned behind a translucent surface within the three-dimensional model. Furthermore, one or more implementations render a visual distortion effect for the identified first portion of the three-dimensional model. Further still, one or more implementations display on a display device the three-dimensional model comprising the translucent surface, such that the three-dimensional model is displayed behind the translucent surface in a distorted form based on the rendered distortion effect.

20 Claims, 8 Drawing Sheets

(56) References Cited

U.S. PATENT DOCUMENTS

| | | | |
|---|---|---|---|
| 4,705,401 A | 11/1987 | Addleman | |
| 5,625,827 A | 4/1997 | Krause | |
| 5,673,374 A | 9/1997 | Sakaibara | |
| 5,801,958 A | 9/1998 | Dangelo | |
| 5,866,419 A | 12/1998 | Lucas | |
| 5,870,771 A | 2/1999 | Oberg | |
| 6,078,332 A | 6/2000 | Ohazama | |
| 6,097,394 A | 8/2000 | Levoy | |
| 6,268,863 B1 | 7/2001 | Rioux | |
| 6,292,810 B1 | 9/2001 | Richards | |
| 6,493,679 B1 | 12/2002 | Rappaport | |
| 6,580,426 B1 | 6/2003 | Small | |
| 6,629,065 B1 | 9/2003 | Gadhi | |
| 6,971,063 B1 | 11/2005 | Rappaport | |
| 7,019,753 B2 | 3/2006 | Rappaport | |
| 7,062,454 B1 | 6/2006 | Giannini | |
| 7,085,697 B1 | 8/2006 | Rappaport | |
| 7,096,173 B1 | 8/2006 | Rappaport | |
| 7,099,803 B1 | 8/2006 | Rappoport | |
| 7,155,228 B2 | 12/2006 | Rappaport | |
| 7,171,208 B2 | 1/2007 | Rappaport | |
| 7,216,092 B1 | 5/2007 | Weber | |
| 7,243,054 B2 | 7/2007 | Rappaport | |
| 7,246,045 B1 | 7/2007 | Rappaport | |
| 7,299,168 B2 | 11/2007 | Rappaport | |
| 7,299,416 B2 | 11/2007 | Jaeger | |
| 7,623,137 B1 | 11/2009 | Miller | |
| 7,817,823 B1 | 10/2010 | O'Donnell | |
| 8,255,338 B1 | 8/2012 | Brittan | |
| 8,271,336 B2 | 9/2012 | Mikurak | |
| 8,276,008 B2 | 9/2012 | Jackson | |
| 8,285,707 B2 | 10/2012 | Day | |
| 8,290,849 B2 | 10/2012 | Eisler | |
| 8,301,527 B2 | 10/2012 | Tarbox | |
| 8,332,401 B2 | 12/2012 | Hull | |
| 8,332,827 B2 | 12/2012 | Edde | |
| 8,335,789 B2 | 12/2012 | Hull | |
| 8,386,918 B2 | 2/2013 | Do | |
| RE44,054 E | 3/2013 | Kim | |
| 8,402,473 B1 | 3/2013 | Becker | |
| 8,423,391 B2 | 4/2013 | Hessedenz | |
| 8,442,850 B2 | 5/2013 | Schorr | |
| 8,510,382 B2 | 8/2013 | Purdy | |
| 8,521,737 B2 | 8/2013 | Hart | |
| 8,566,419 B2 | 10/2013 | Purdy | |
| 8,600,989 B2 | 12/2013 | Hull | |
| 8,626,877 B2 | 1/2014 | Greene | |
| 8,645,973 B2 | 2/2014 | Bosworth | |
| 8,650,179 B2 | 2/2014 | Driesch | |
| 2004/0027371 A1 | 2/2004 | Jaeger | |
| 2004/0075655 A1 | 4/2004 | Dunnett | |
| 2004/0100465 A1 | 5/2004 | Stowe | |
| 2004/0174358 A1 | 9/2004 | Takagi | |
| 2005/0072059 A1 | 4/2005 | Hodsdon | |
| 2005/0104883 A1 | 5/2005 | Snyder | |
| 2006/0274064 A1* | 12/2006 | Dougherty et al. | 345/422 |
| 2007/0098290 A1 | 5/2007 | Wells | |
| 2007/0109310 A1 | 5/2007 | Xu | |
| 2007/0276791 A1 | 11/2007 | Fejes | |
| 2009/0187389 A1 | 7/2009 | Dobbins | |
| 2010/0018141 A1 | 1/2010 | Kelly | |
| 2010/0268513 A1 | 10/2010 | Loberg | |
| 2011/0227922 A1 | 9/2011 | Shim | |
| 2011/0227924 A1 | 9/2011 | Nakajima | |
| 2011/0265405 A1 | 11/2011 | Ksenych | |
| 2012/0288184 A1 | 11/2012 | Zomet | |
| 2014/0095122 A1 | 4/2014 | Appleman | |

FOREIGN PATENT DOCUMENTS

| | | |
|---|---|---|
| JP | 2007264707 | 10/2007 |
| WO | 02059545 | 8/2002 |
| WO | 2007138560 | 12/2007 |
| WO | WO2013040016 | 3/2013 |

OTHER PUBLICATIONS

Ram Shacked et al.; "Automatic Lighting Design Using a Perceptual Quality Metric"; 2001; Eurographics 2011 vol. 20 (2001); p. 1-12.*

Jeremy Birn, "Digital Lighting and Rendering," Pearson Education, 2nd ed., 2006, ISBN 0132798212. See p. 35-59.

Ravi Mamoorthi et al., "A First-Order Analysis of Lighting, Shading, and Shadows," ACM Transactions on Graphics, vol. 26, No. 1, Article 2, Jan. 31, 2007 See p. 2, 8, and 12-15.

Erco, "Erco Guide," http://www.erco.com/download/ data/30_media/_guide_pdf/ 120_en/_erco_guide_7_simulation.pdf, May 12, 2006. See p. 376, 389-388, 399, and 427.

Joseph Zupko et al., "System for Automated Interactive Lighting (SAIL), " In: Proceedings for the 4th International Conference on Foundations of Digital Games, 2009, pp. 223-230. See pp. 223-226.

Maxwell Render, "Maxwell Render 2.5 User Manual," http://www.architektur.uni-kl.de/digitalwrkzeuge/ss13/digitalewerkzeuge/maxwel-english.pdf, Dec. 31, 2010. See p. 22-25, 36-37, and 48-49.

Pierre-Felix Breton, "Autodesk Revit and ads Max Design for Lighting and Daylighting simulation," http://www.pfbreton.com/wordpress/wp-contentJuploads/2012/05/L12L07%20Handout.pdf, May 7, 2012. See pp. 28, 51-52, and 87-103.

David Cohn, "Photorealistic Rendering Techniques in AutoCAD3D, " Autodesk University 2009, http://www.dscohn.com/AU/handouts/AU214-2%20-%20Photorealistic%20Rendering%20Techniques%20in%20AutoCAD%203D.pdf, Dec. 31, 2009. See pp. 4-6.

International Search Report and Written Opinion for PCT/US2012/068805 mailed Aug. 29, 2013.

International Search Report and Written Opinion for PCT/US2013/024009 mailed Oct. 25, 2013.

International Search Report and Written Opinion for PCT/US2013/024063 mailed Oct. 25, 2013.

International Search Report for PCT/US2013/023198 mailed Oct. 18, 2013.

Non-Final Office action for U.S. Appl. No. 14/348,879 maield on Sep. 22, 2015.

Non-Final Office action for U.S. Appl. No. 14/113,260 mailed Sep. 14, 2015.

International Search Report and Opinion, PCT/US2013/045047, mailed Mar. 3, 2014.

International Search Report and Opinion, PCT/US2013/043735, mailed Feb. 27, 2014.

International Search Report and Opinion, PCT/US2013/050764, mailed Feb. 27, 2014.

Non-Final Office Action for U.S. Appl. No. 14/110,910 mailed for Sep. 14, 2015.

* cited by examiner

VISUAL DISTORTION EFFECTS THROUGH TRANSLUCENT STRUCTURES IN DESIGN SOFTWARE

CROSS-REFERENCE TO RELATED APPLICATIONS

The present invention is a 35 U.S.C. §371 U.S. National Stage of PCT Application No. PCT/US2013/024063 filed Jan. 31, 2013, entitled "Visual Distortion Effects through Translucent Structures in Design Software" the entire content of which is incorporated by reference herein.

BACKGROUND OF THE INVENTION

1. The Field of the Invention

This present invention relates generally to computer-aided design or drafting software.

2. Background and Relevant Technology

Computer systems now play a critical role in building and/or architectural design. In particular, architects and interior designers ("or designers") use a wide range of computer-aided design (CAD) software for designing the aesthetic as well as functional aspects of a given residential or commercial space. For example, a designer might use an architectural design program (e.g., a CAD program) to design the interior layout of an office building. The designer might then render the layout to create a three-dimensional model of the interior of the office building that can be displayed to a client.

Some CAD programs may provide the designer with the ability to create three-dimensional models using a variety of different building materials. For example, the designer may be able to design a particular entryway within the three-dimensional model to have marble floors and wood paneling on the walls. Similarly, the designer may design an office space to have a large window looking outside and a frosted glass window inset within an office door. One will understand that allowing a designer to utilize a variety of materials when designing a three-dimensional model will result in a more visually appealing three-dimensional model. Additionally, allowing a designer to utilize a variety of materials when designing the three-dimensional model will allow the model to more accurately reflect a real-world building.

In at least some situations, a designer may choose to use a glass panel as a wall within the three-dimensional model. For example, when designing a restroom shower, a designer may choose to create the shower stall with a glass panel as a door. Similarly, a designer may choose to use a glass panel within a three-dimensional model of an office. Specifically, the designer may use the glass panel as a part of a door to the office or as a decorative feature positioned as a wall.

Some conventional CAD programs may provide a designer with the ability to incorporate glass panels into a three-dimensional model. In some cases, however, a designer may desire to incorporate a translucent panel into a three-dimensional model. For example, a designer may desire to create a decorative wall portion that is constructed of a translucent glass (e.g., a frosted glass panel inset within a door). Unfortunately, certain types of effects for viewing translucent surfaces within a three-dimensional model tend to be very limited.

For example, many translucent surfaces allow only distorted images and distorted light to pass through the surface. Many conventional CAD programs, however, have only limited, if any, ability to distort the objects on the opposing side of the translucent surface in a realistic manner. In some cases, conventional CAD programs may completely neglect to distort the image in any way. In contrast, some conventional CAD programs may render the surface such that there is essentially no indication of any objects on the opposing side of the translucent surface. One will understand that providing a realistic distortion effect caused by translucent surfaces can be beneficial to designers using CAD programs because it will allow a designer to visualize and understand in a more realistic way the three-dimensional models that the designer has drawn.

Accordingly, an advantage in the art can be realized with systems, methods, and computer program products that distort images that are at least partially viewable through translucent surfaces.

BRIEF SUMMARY OF THE INVENTION

Implementations of the present invention overcome one or more problems in the art with systems, methods, and apparatus configured to create translucent surfaces within a three-dimensional model. In particular, at least one implementation of the present invention renders a translucent surface that distorts a view of objects on an opposing side of the translucent surface. Additionally, in at least one implementation of the present invention, a distortion effect rendered with respect to a translucent surface depends upon the composition of the surface. Furthermore, at least one implementation of the present invention allows a user to create realistic visual distortion effects through translucent structures within a three-dimensional model.

For example, a method in accordance with at least one implementation for creating translucent surfaces within a three-dimensional model can include rendering a three-dimensional model of a layout of a design space within an architectural design environment. The method can also include identifying a first portion of the three-dimensional model that is positioned behind a translucent surface within the three-dimensional model. In addition, the method can include rendering a visual distortion effect for the identified first portion of the three-dimensional model. Furthermore, the method can include displaying on a display device the three-dimensional model comprising the translucent surface. As such, the three-dimensional model is displayed behind the translucent surface in a distorted form based on the rendered distortion effect.

In an additional or alternative implementation, a method for rendering a translucent surface within a three-dimensional model can include rendering a three-dimensional model of a layout of a design space within an architectural design environment. The method can also include identifying a translucent surface within the three-dimensional model. Additionally, the method can include performing a distortion effect on the translucent surface. In such a case, the distortion effect can include masking a portion of the three-dimensional model from the translucent surface. Additionally, the distortion effect can include blurring one or more of the pixels of the translucent surface. Further, the method can also include displaying to a user the three-dimensional model, including the translucent surface.

These and other objects and features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and apparatus configured to create translucent surfaces within a three-dimensional model. In particular, at least one implementation of the present invention renders a translucent surface that distorts a view of objects on an opposing side of the translucent surface. Additionally, in at least one implementation of the present invention, a distortion effect rendered with respect to a translucent surface depends upon the composition of the surface. Furthermore, at least one implementation of the present invention allows a user to create realistic visual distortion effects through translucent structures within a three-dimensional model.

For example, at least one implementation relates to displaying, in real-time, a three-dimensional model that comprises a translucent surface. As used within this application a translucent surface can comprise any surface that either distorts or partially blocks at least some light as it passes through the surface. A translucent surface can comprise glass, plastic, or any other material through which at least some light can pass.

Additionally, in at least one embodiment, a translucent surface can provide a distorted view of objects that are on an opposing side of the surface from the user's perspective. For example, a three-dimensional model of an office may include a wall that is constructed, at least in part, of a frosted glass panel. The frosted panel may separate the office from a sitting area. In at least one implementation, the software provides a distorted view of the sitting area to a user as viewed through the frosted glass panel within the office.

In addition, in at least one implementation the distortion effect that is created by the translucent surface depends upon the composition of the translucent surface. For example, the translucent surface may only be slightly frosted such that an object on the opposing side of the translucent surface is only slightly distorted. Similarly, the translucent surface can comprise a colored or a tinted material such that the software displays an object on the opposing side of the translucent surface as distorted and slightly colored with respect to the color of the translucent material.

Further, in at least one implementation a mask can be used when distorting the translucent surface to prevent artifacts from appearing within the distorted surface. For example, a mask can be used to prevent the distortion algorithm from sampling elements of the scene that are bordering the translucent surface. As used within this application, a "mask" comprises any construct meant to temporarily prevent a specific portion of the scene from being accessed. For instance, in at least one implementation, a mask comprises rendering the entire scene, except the area to be distorted, as a single color, such as black. As used in this implementation, whenever the distortion algorithm accesses an area of the scene that is black, that area is not used in computing a distortion effect. One will understand that a mask can be created in a variety of different ways and still remain within the scope of the present invention. For example in at least one implementation, a mask can be created by a color other than black.

Accordingly, one will appreciate in view of the specification and claims herein that at least one implementation of the present invention allows a user to create a three-dimensional model comprising translucent surfaces. The inventive software can accurately and efficiently display the model through a graphical user interface just as the parts would look in real-life, after assembly. Specifically, at least one implementation of the present invention allows a user to create a translucent surface that at least partially distorts the view of an object on an opposing side of the translucent surface. In addition, at least one implementation further allows for different distortion effect depending upon the make-up of a particular translucent surface.

Figure 1:
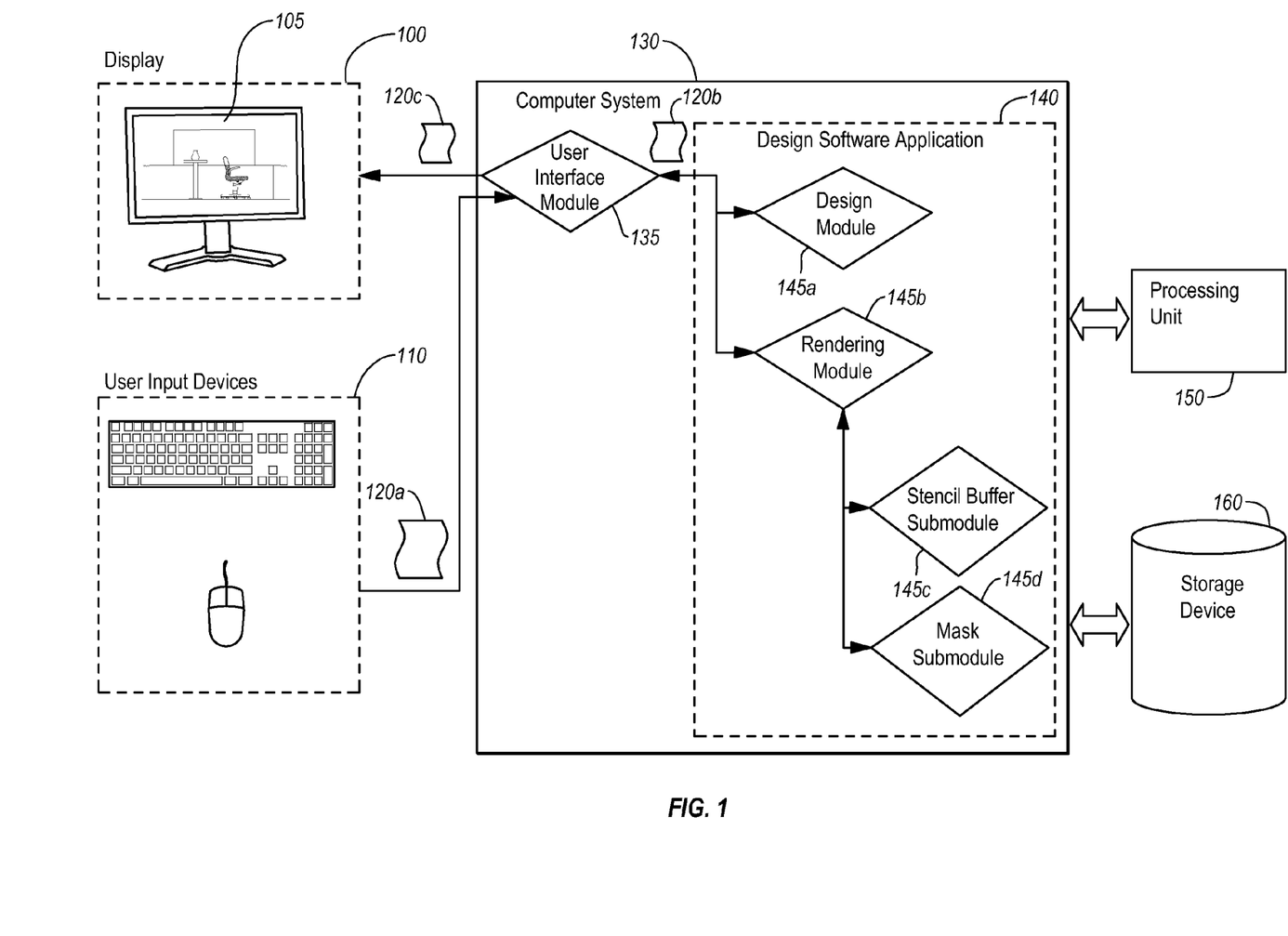
FIG. 1 illustrates an architectural schematic diagram of a system for creating a translucent surface within a three-dimensional model.

Along these lines, FIG. 1 depicts an architectural schematic diagram of a computer system 130 for creating a translucent surface within a three-dimensional model 105. In particular, FIG. 1 shows user input devices 110 that communicate with the computer system 130, which in turn communicates with a display 100. FIG. 1 shows that the user input devices 110 can include any number of input devices or mechanisms, including but not limited to a mouse 112a, a keyboard 112b, or other forms of user input devices, including any number of remote or touch-screen oriented input devices.

In addition, FIG. 1 shows that computer system 130 comprises a design software application 140 executed by a processing unit 150. One will appreciate that the processing unit 150 can comprise a central processing unit, a graphics processor, a physics processor, or any other type of processing unit. FIG. 1 further shows that the computer system 130 can comprise a storage device 160. In at least one implementation, the storage device 160 can comprise RAM, a hard disk, solid state memory, or any other applicable computer storage medium. The storage device 160 can contain, among other things, templates and objects that can be placed within a three-dimensional model 105. Additionally, the storage device can be used for temporary storage of frequently accessed items. These components, in conjunction with processing unit 150, store and execute the instructions of design software application 140.

FIG. 1 shows that a user in this case uses the input device(s) 110 to send one or more request 120a to the computer system 130. In one implementation, the processing unit 150 implements and/or executes the requests from user input devices 110 and design software application 140 instructions. For example, a user can provide one or more inputs 120*a* relating to the design and rendering of a three-dimensional model 105 within a design software application 140, as executed by processing unit 150. FIG. 1 further shows that the design software application 140 can then pass the inputs 120*b* to the appropriate modules within the design software application 140.

Ultimately, design software application 140 can then send corresponding rendering instructions 120*c* through the rendering module 145*b* to the display 100. As shown in FIG. 1, for example, the display 100 displays a graphical user interface in which the user is able to interact (e.g., using the user input devices 110, or perhaps directly in the case of a touch screen display). In particular, FIG. 1 shows that the graphical user interface can include a depiction of a three-dimensional model 105 of a design space, comprising in this case two items of furniture separated by a clear glass panel and a frosted glass panel.

One will appreciate in view of the specification and claims herein that the user interface module 135 can provide to the user an option to make design changes to the three-dimensional model 105. In at least one implementation, for example, upon receiving a request for some modification, the user interface module 135 can communicate the request to the design module 145*a*. One will appreciate that the design module 145*a* can then provide the user with the ability to, among other options, place new objects within the three-dimensional model 105, manipulate and change objects that are already within the three-dimensional model 105, place translucent surfaces within the three-dimensional model, or change parameters relating to the three-dimensional model 105. In some cases, this can include the design module 145*a* communicating with the storage device 160 to retrieve, among other things, templates and objects that can be placed within a three-dimensional model 105.

After receiving and processing a user input/request, the design module 145*a* can then send a corresponding request to the rendering module 145*b* for further processing. In one implementation, for example, this further processing can include rendering module 145*b* rendering the depiction of the three-dimensional model 105 shown, in this case, on the display 100 in FIG. 1. One will appreciate that the rendered depiction can include a translucent surface.

FIG. 1 further shows that the rendering module 145*b* can communicate with a stencil buffer submodule 145*c*. In at least one implementation, the stencil buffer submodule 145*c* can identify an area where a translucent surface has been placed within a three-dimensional model 105, and load that area into a stencil buffer. Thus, in at least one implementation, when the stencil buffer submodule 145*c* loads the area where the translucent surface has been placed into the stencil buffer, the area (behind the translucent surface) is not initially rendered. Rather, the rendering module 145*b* renders the rest of the scene that is outside the translucent surface, and then subsequently renders that area behind the translucent surface, as discussed more fully herein.

One will appreciate that the use of a stencil buffer, in this case, is merely exemplary. In general, a stencil buffer can be used to create a mask over a certain portion of a scene. The scene can then be rendered while excluding the portion that is covered by the mask from rendering. One will understand, however, that other methods are known in the art for creating a mask over a portion of a scene, such that the masked portion is not rendered.

Additionally, FIG. 1 shows that the rendering module 145*b* can communicate with a mask submodule 145*d*. In at least one implementation, the mask submodule 145*d* can create a mask over a portion of the scene to prevent the masked portion from being accessed by a distortion algorithm. (Otherwise, the software applies the distortion algorithm to all unmasked surfaces within the three-dimensional model 105—e.g., those behind the translucent surface, or elsewhere as appropriate). For example, in at least one implementation, the mask submodule 145*d* can render a portion of the scene as a single color. When applying a distortion algorithm to a scene, the rendering module 145*b* can then ignore any portion of the scene that is the same color as the mask. As will be described at greater length below, using a mask in this way may help prevent the appearance of artifacts within a translucent surface in the three-dimensional model 105.

One will understand that there are several different methods for creating a mask. For example, a mask can be created by rendering a particular area to comprise a distinct characteristic, such that it is apparent to the rendering module 145*b* that the area has been masked. Additionally, in at least one implementation, an alpha channel can be utilized to create a mask.

Similar to above, one will understand that in at least one implementation the stencil buffer can be used to create a mask over the scene. In this application, for the sake of clarity, the stencil buffer submodule 145*c* is referenced with respect to the translucent surface and the masking submodule 145*d* is referenced with respect to the rest of the scene. One will appreciate, however, that in at least one implementation, the masking submodule 145*d* and the stencil buffer submodule 145*c* can be used interchangeably.

Further, in at least one implementation, the rendering module 145*b* can then apply a distortion algorithm to the area of the scene that was previously loaded into the stencil buffer. In at least one implementation, applying the distortion algorithm to the area that was loaded into the stencil buffer can create the appearance of a translucent surface positioned over the area. The rendering module 145*b* can then communicate 120*b* the rendered three-dimensional model 105 to the user interface module 135, which, in turn, can send the information 120*c* to the display 100, as discussed more fully below.

Figure 2:
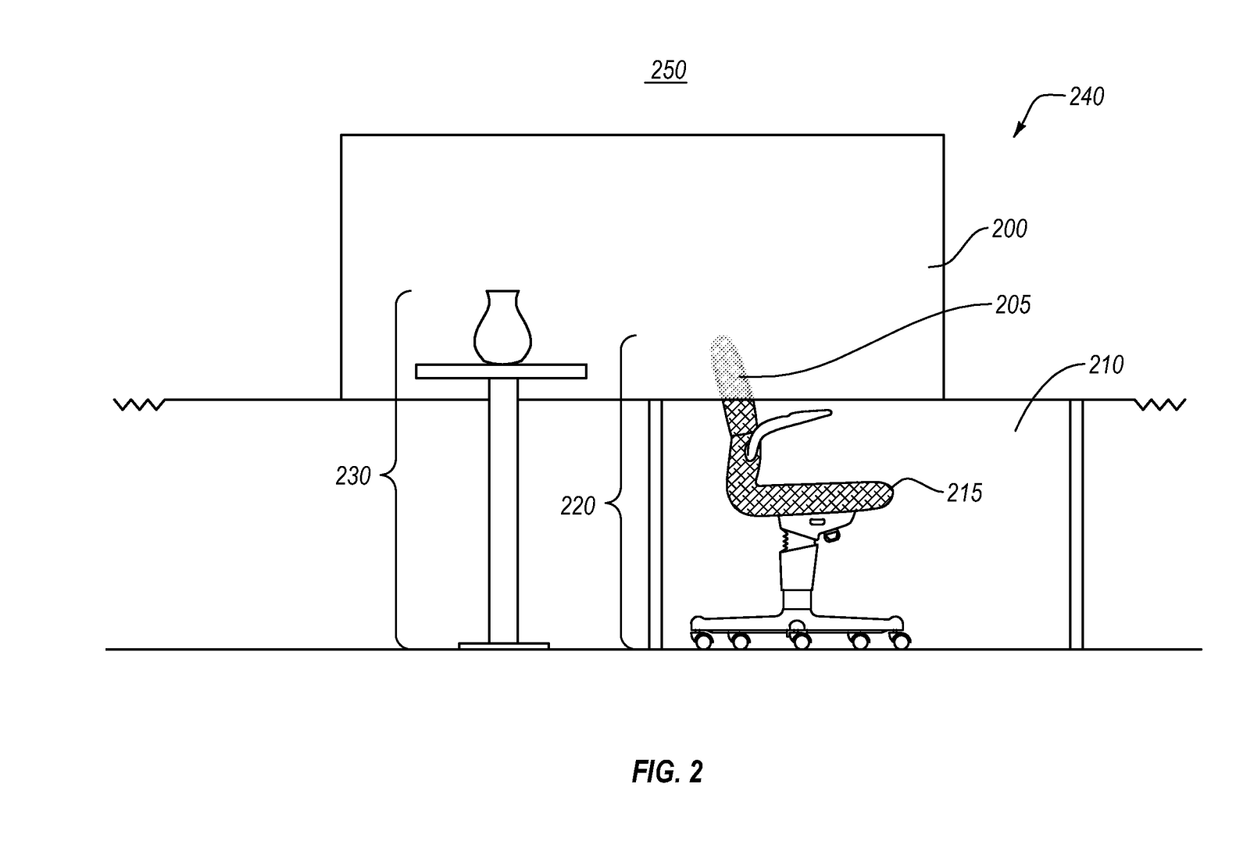
FIG. 2 illustrates a translucent surface within a three-dimensional model.

For example, FIG. 2 depicts a scene 250 from a three-dimensional model 105 that has been rendered by a design software application 140. As shown, scene 250 depicts a vase and pedestal 230 on one side of a wall 240, and a chair 220 on the other side of the wall 240. FIG. 2 further shows that wall 240, in turn, is comprised of a translucent panel 200 and a clear glass panel 210, whereby the bottom portion of the chair 215 is clearly visible through the clear glass panel 210, while the top portion of the chair 205 is being distorted by the translucent panel 200. One will understand that the translucent panel 200 can be comprised of any material (or arrangement thereof) that partially obscures light from passing through.

One will appreciate that the level of distortion that the translucent panel 200 creates can vary widely depending upon the characteristics of the translucent panel 200 selected by the user. For example, the translucent panel 200 can comprise a heavily frosted glass pane, such that top of the chair 205 is heavily distorted and barely visible to a user of the design software application 140. In contrast, the translucent panel 200 can comprise an only slightly frosted glass pane such that the top of the chair 205 is only slightly distorted to the user.

Additionally, in at least one implementation the translucent panel 200 can further distort the view of objects on the opposing side of the panel 200 by incorporating a color. For example, the user may have selected a translucent panel 200 may include a green tint (not shown). One will appreciate that the green tint can further influence (beyond basic frosting) the appearance of the top of the chair 205 through the translucent panel 200. Similarly, in at least one implementation, if the color of the translucent panel 200 is pronounced enough, it may be difficult or impossible to distinguish the actual color of the top of the chair 205 through the translucent panel 200, because the distorted image of the top of the chair 205 will appear to be the color of the translucent panel 200.

When rendering a scene 250 within a three-dimensional model 105, in at least one implementation, the rendering module 145b can determine what objects and area on the opposing side of the translucent panel 200 are visible to a user through the translucent panel 200. For example, the rendering module 145b can determine what areas on the opposing side of the translucent panel 200 are visible to the user based upon the position of the user's perspective within the three-dimensional model 105. In at least one implementation, the rendering module 145b relies upon the stencil buffer submodule 145c to determine what objects and area on the opposing side of a translucent panel 200 are visible to a user. For instance, an exemplary stencil buffer submodule 145c can perform this function by loading the area of the scene 250 encompassed by the translucent panel 200.

Figure 3:
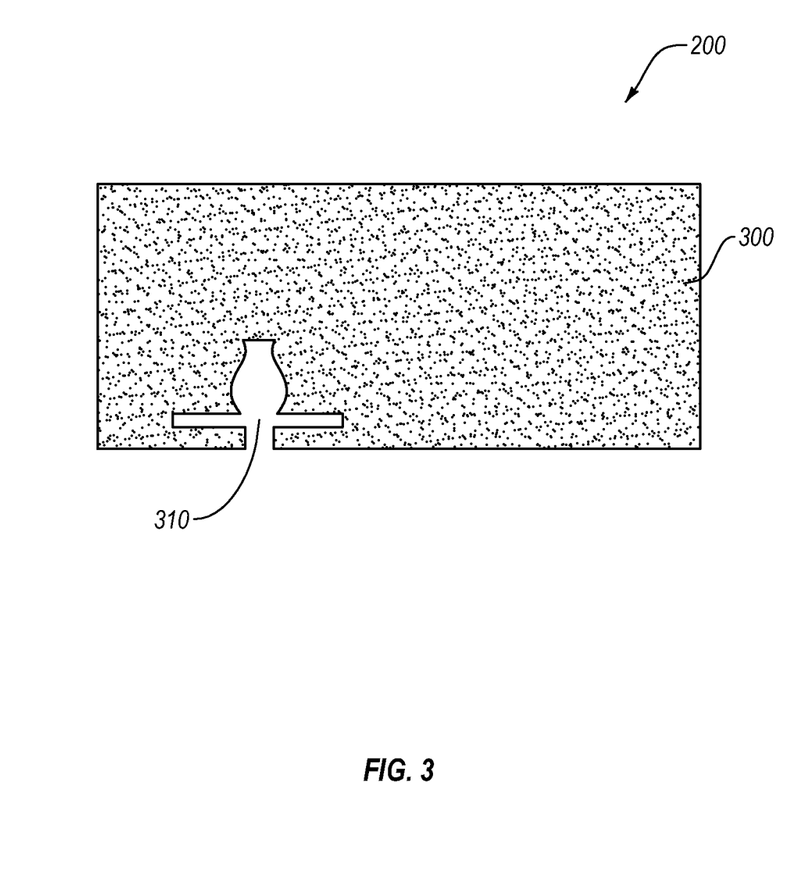
FIG. 3 illustrates a stencil buffer comprising at least a portion of the translucent surface.

Along these lines, FIG. 3 depicts the translucent panel 200 of FIG. 2 loaded into a stencil buffer 300. In the depicted implementation, the stencil buffer 300 represents the area that the translucent panel 200 comprises as being black. One will understand that conventional stencil buffers generally use integer values to represent the contents of the buffer. For the sake of clarity, however, FIG. 3 depicts the loaded content as simply being black.

In addition, FIG. 3 shows that the stencil buffer 300 does not include the area comprising the vase and pedestal 310, since they are in front of the panel 200. That is, objects that are in front of the translucent panel 200 (with respect to the user's perspective) will not be loaded into the stencil buffer 300. One will appreciate that objects (e.g., the vase and stand) in front of the panel 200 are not distorted by the panel 200; similarly, the portion of the panel 200 behind the object(s) need not be loaded into the stencil buffer 300 since such objects in front of the panel 200 obscure that portion of the panel 200 to the user.

Figure 4:
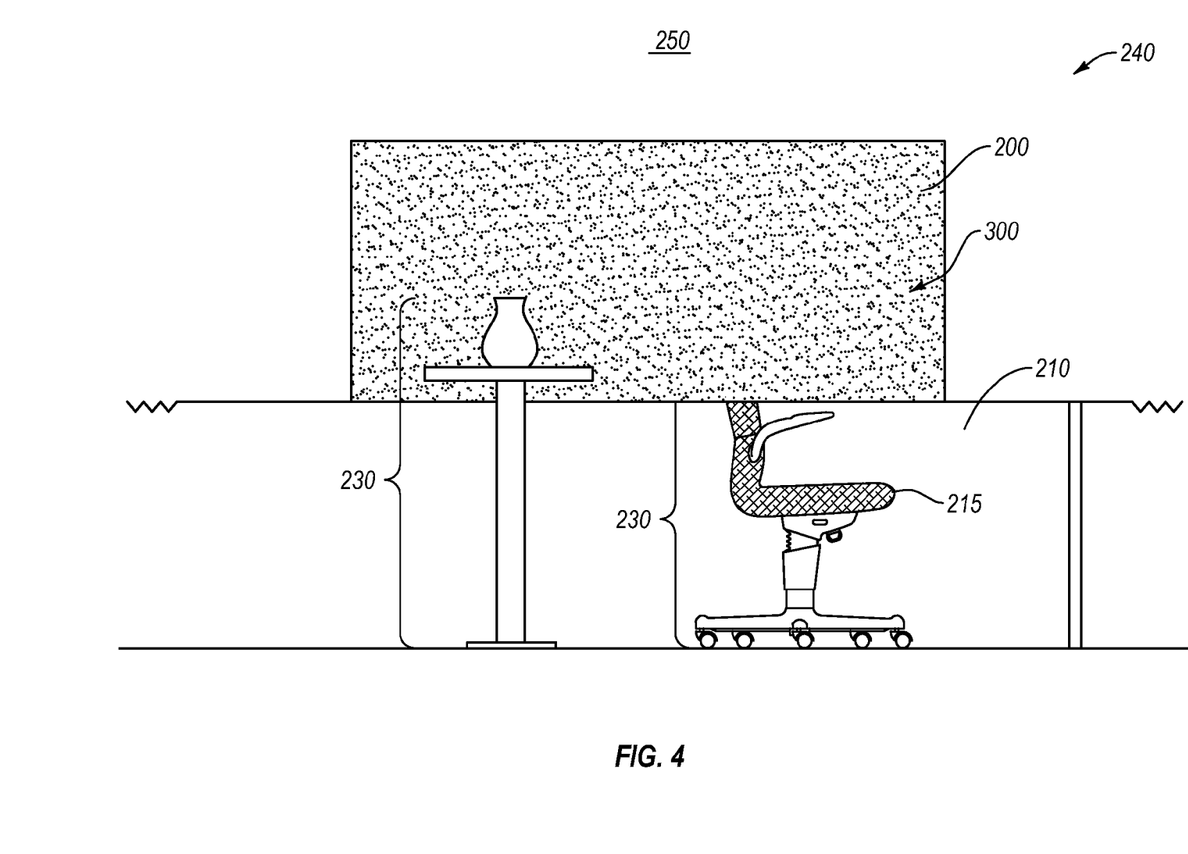
FIG. 4 illustrates a rendered scene and stencil buffer.

In any event, after loading the visible area encompassed by translucent panel 200 into the stencil buffer, the rendering module 145b can then render the portions of the scene that are not loaded into the stencil buffer 300. For example, FIG. 4 depicts a rendering of scene 250 showing the vase and stand, the unobscured portion of the chair, etc. As previously mentioned, these objects (or portions thereof) are rendered because they were not loaded into the stencil buffer. After rendering these viewable objects, the inventive software then proceeds to render those items obscured by the translucent panel 200.

In at least one implementation, the rendering module 145b does not immediately transmit the scene depicted in FIG. 4 to the user interface module 135 to then be sent to the display 100. Rather, in at least one implementation, the inventive software uses the scene depicted in FIG. 4 as an intermediary step in rendering a complete scene (as depicted in FIG. 2). For example, prior to sending a scene 250 to be depicted on the display 100, the rendering module 145b can apply a distortion effect to the translucent panel 200.

Figure 5A:
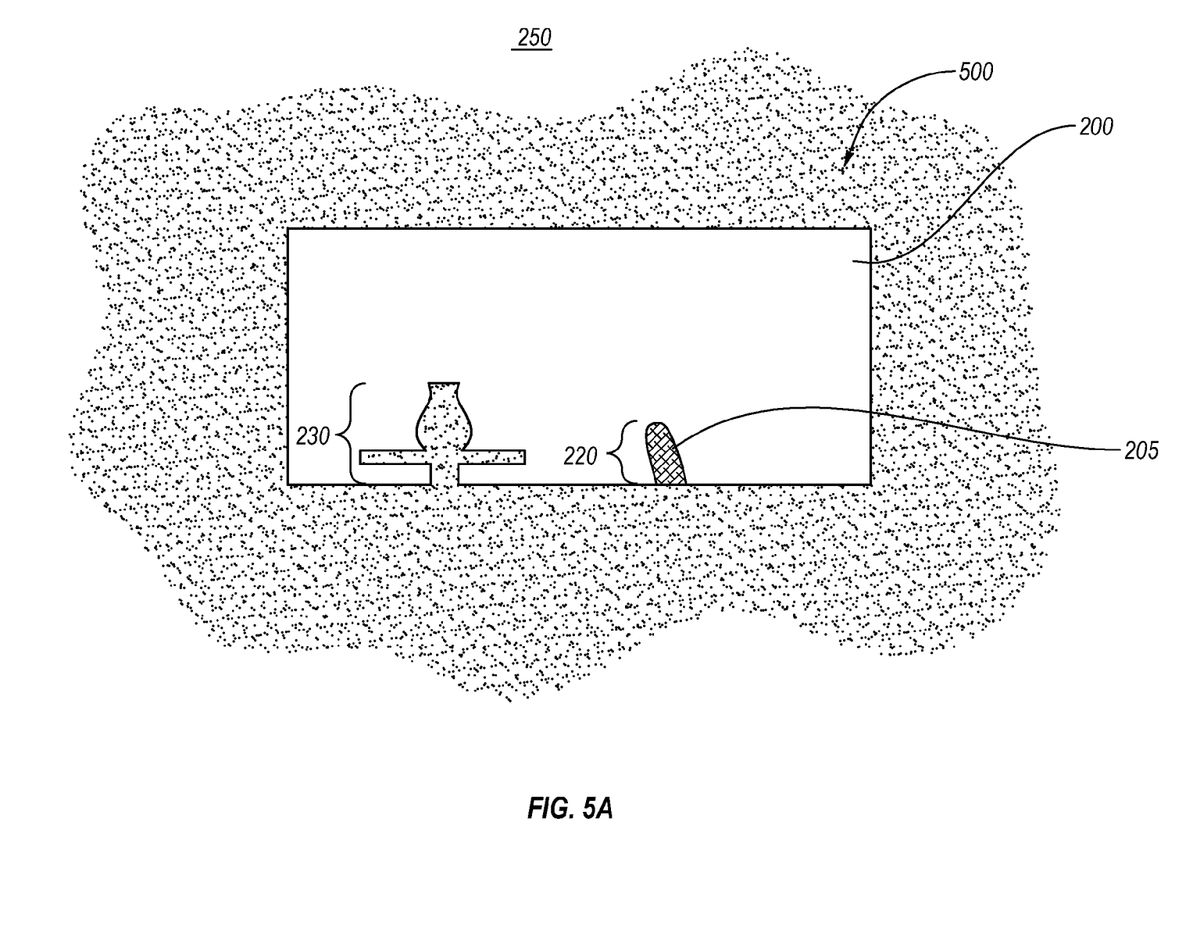
FIG. 5A illustrates a translucent surface prior to the application of a distortion effect.

In at least one implementation, the inventive software first applies a mask 500 (e.g., via a mask submodule 145d) to the areas of the scene 250 that are not being distorted. For example, FIG. 5A depicts the area that the translucent surface comprises and a mask 500 that has been applied to the rest of the scene 250 (i.e., the outside surfaces of the vase and pedestal, and all other aspects of the scene outside the translucent panel 200). One will appreciate that FIG. 5A illustrates the top of the chair 205 without distortion because the distortion algorithm has not yet been applied.

Upon masking, the rendering module 145b can then apply the distortion algorithm as appropriate to the translucent panel 200 by blurring the area that the translucent panel 200 comprises. In at least one implementation, this can be accomplished by the rendering module 145b applying a blurring algorithm, such that the blurring algorithm samples each pixel within the panel 200 and causes each pixel to blend the contents of a certain number of neighboring pixels into itself. One will understand that causing each pixel to blend with a certain number of neighboring pixels can cause the blended pixels to appear blurry and distorted.

Furthermore, in at least one implementation this blending effect can be implemented by sampling the colors of a certain number of pixels surrounding a target pixel, performing a blending of the color values, and applying the blended color to the target pixel. One will understand that there are a number of methods that can be used to blend the color values in a blurring effecting including, but not limited to, Gaussian blurs, linear blurs, weighted average blurs, and other known blur functions.

In at least one implementation, the inventive software can apply the blurring effect by randomly sampling a number of pixels surrounding a target pixel, and using the contents of the randomly sampled pixels to create a blurring effect. For example, in contrast to sampling every pixel within a five-pixel radius of the target pixel, the rendering module 145b can randomly sample a select number of pixels within the radius, and use those pixels to create the blurring effect. One will understand that performing the blurring effect by randomly sampling a smaller number of pixels instead of sampling every pixel within a specific radius can cause the blurring effect to require less system resources.

Further, in at least one implementation, the rendering module 145b can be adapted to ignore pixels that are covered by the mask 500 when creating a distortion effect. For example, when applying a blurring effect to a target pixel within the translucent panel 200, the rendering module 145b can be adapted to ignore any sampled pixels that are covered by the mask 500. For instance, in at least one implementation, the rendering module 145b can determine that a sampled pixel is covered by the mask 500 if the sampled pixel is the same color as the mask 500.

One will appreciate that using the mask 500 to prevent the sampling of pixels that are outside of the translucent panel 200 can aid in limiting the number of artifacts that appear within the translucent panel. For instance, without the mask 500, the blurring effect can blend into a target pixel color information from sampled pixels that are not part of the translucent panel 200. In some cases, incorporating color information from pixels that are not part of the translucent panel 200 into a target pixel can cause artifacts to appear—such as causing the vase and pedestal 230 to have a blurry or distorted perimeter.

For example, if the rendering module 145b were to perform a blurring effect on a frosted glass window that is set within a wood frame, and if the wood frame was not covered by a mask, pixels representing the wood frame can be blended into pixels that are on the edge of the frosted glass window. One will understand that blending pixels that represent wood into pixels that represent frosted glass can lead to the creation of artifacts within the translucent surface. In at least one implementation, covering the areas of the scene 250 that are not part of the translucent panel 200 with a mask 500 can prevent the appearance of artifacts within the translucent panel 200 by preventing the rendering module 145b from sampling pixels that are covered by the mask 500.

Figure 5B:
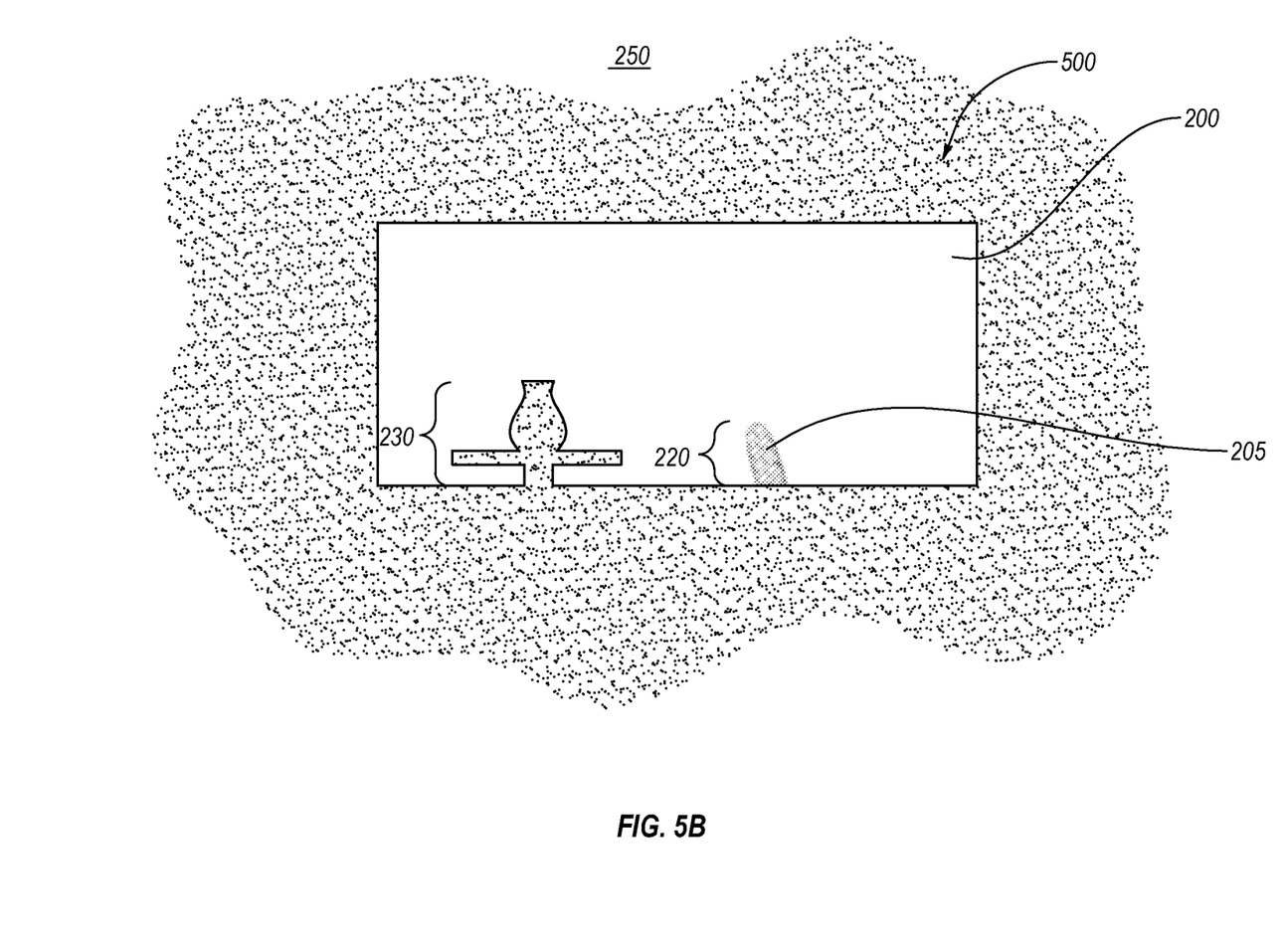
FIG. 5B illustrates a translucent surface after the application of the distortion effect.

FIG. 5B depicts the translucent panel 200 after the rendering module 145b has applied the distortion effect. In particular, FIG. 5B shows the same scene as illustrated in FIG. 5A, except that the top of the chair is now blurred. Specifically, FIG. 5B shows that the rendering module 145b did not apply the distortion algorithm to the vase and pedestal since they are protected by the mask 500. In contrast, the rendering module 145b did apply the distortion algorithm to the top of the chair 205, and, as a result, the chair appears to have been distorted by the translucent panel 200.

In general, one will appreciate that the entire area encompassed by translucent panel 200 (excluding the areas covered by the mask 500), will appear to be distorted. In other words, the distortion algorithm will not only distort objects that are on the opposing side of the translucent panel 200, such as the top of the chair 205. The distortion algorithm will also distort the translucent panel 200 itself, such that the entire panel appears to have a distortion effect associated with it. In at least one implementation, the rendering module 145b can distort the entire translucent panel 200 by applying a blurring effect to the entire panel.

Additionally, in at least one implementation, the translucent panel 200 may comprise a pattern—for example, a logo that has been etched into a frosted glass panel. In at least one implementation, the blurring effect can blur the translucent panel 200 without distorting the pattern. For example, in at least one implementation, a mask can be applied to the pattern to prevent it from being blurred. Additionally, in at least one implementation, the translucent panel 200 can be blurred without the pattern and then the pattern can be added to the translucent panel 200 using an alpha channel.

Furthermore, the distortion panel may comprise a tint or color. In at least one implementation, if the translucent panel 200 of FIG. 5B comprises a certain tint, the rendering module 145b can distort the panel 200, including the top of the chair 205, by biasing the blur algorithm to include the color or tint. In at least one implementation, the rendering module 145b can bias the blurring algorithm by detecting the color or tint of the translucent panel 200 and adding that color or tint to every pixel that is blurred.

Additionally, in at least one implementation, the rendering module 145b can determine the material of which the translucent panel 200 is comprised. One will understand that different materials will influence the level of translucence and distortion that a translucent panel 200 causes. Further, the rendering module 145b can apply distortion effects that are unique to different materials. For example, the rendering module 145b can apply a distortion algorithm that only lightly distorts the translucent panel 200 if the panel 200 is lightly frosted glass. In contrast, if the translucent panel is heavily frosted, blue tinted glass, then the rendering module 145b can apply a distortion algorithm that heavily distorts the translucent panel 200 and incorporates the proper amount of blue tinting into the distortion. One will understand that the rendering module 145b can incorporate similar adjustments to the distortion algorithm to reflect a variety of translucent materials.

One will also appreciate that the distorted translucent panel 200 of FIG. 5B can be combined with the rendered scene 250 from FIG. 4 to generate the completed scene 250 of FIG. 2. In such a case, the rendering module 145b can then send the information 120b to the user interface module 135, which can in turn communicate the information 120c to the display.

Accordingly, FIGS. 1-5B and the corresponding text illustrate or otherwise describe one or more components, modules, and/or mechanisms for efficiently and realistically dealing with objects behind a translucent surface 200 within a three-dimensional model 105. One will appreciate that implementations of the present invention can also be described in terms of flowcharts comprising one or more acts for accomplishing a particular result. For example, FIGS. 6 and 7 and the corresponding text describe acts in a method for creating translucent surfaces 200 within a three-dimensional model. The acts of FIGS. 6 and 7 are described below with respect to the components and modules of FIGS. 1-5B.

Figure 6:
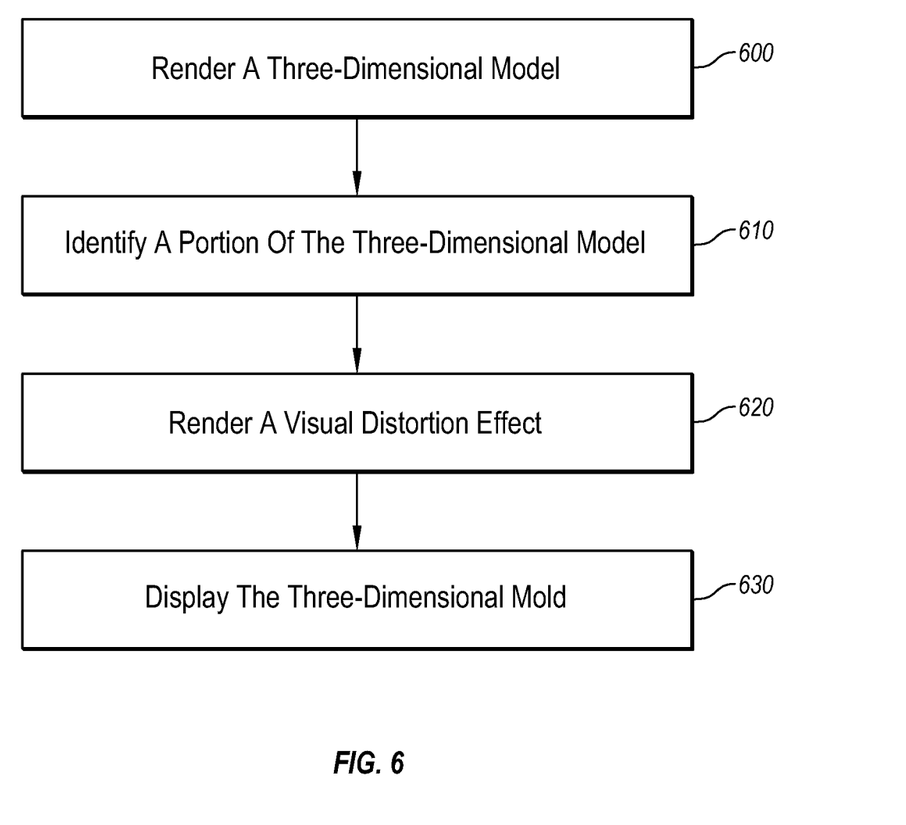
FIG. 6 illustrates a flow chart of a series of acts in a method in accordance with an implementation of the present invention for creating a translucent surface within a three-dimensional model.
Figure 7:
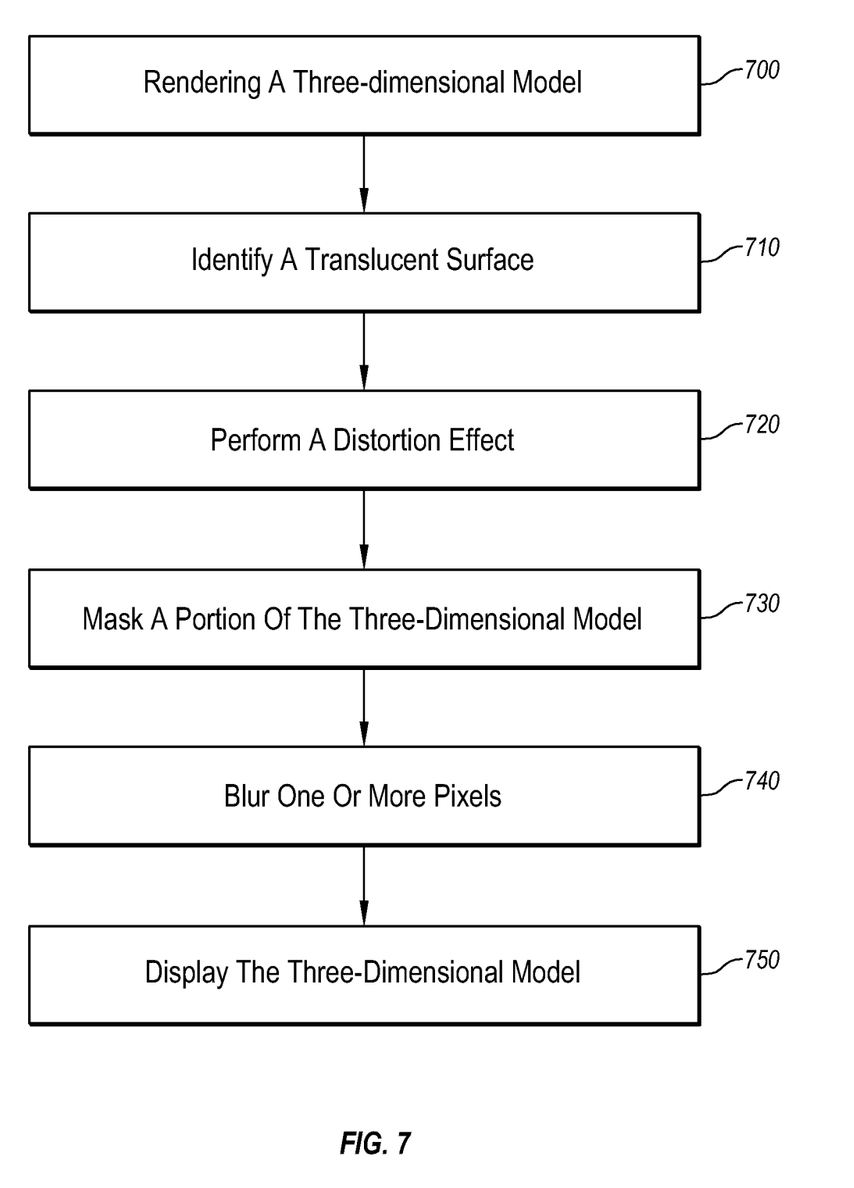
FIG. 7 illustrates another flow chart of a series of acts in a method in accordance with an implementation of the present invention for creating a translucent surface within a three-dimensional model.

For example, FIG. 6 illustrates that a method in accordance with an implementation of the present invention for creating translucent surfaces within a three-dimensional model can comprise an act 600 of rendering a three-dimensional model. Act 600 can include rendering a three-dimensional model of a layout of a design space within an architectural design environment. For example, FIG. 2 shows a scene 250 from a three-dimensional model 105 that has been rendered.

Additionally, FIG. 6 shows that the method can comprise an act 610 of identifying a portion of the three-dimensional model 105. Act 610 can include identifying a first portion of the three-dimensional model that is positioned behind a translucent surface within the three-dimensional model. For example, FIG. 5A shows an identified portion of the three-dimensional model—a top of a chair 205—that is at least partially viewable through the translucent surface from the perspective of the user.

Furthermore, FIG. 6 shows that the method can comprise an act 620 of rendering a visual distortion effect. Act 620 can include rendering a visual distortion effect for the identified first portion of the three-dimensional model. For example, FIG. 2 shows a visual distortion that has been rendered for a portion 200 of the three-dimensional model 105.

Further still, FIG. 6 shows that the method can comprise an act 630 of displaying the three-dimensional model. Act 630 can include displaying on a display device the three-dimensional model comprising the translucent surface, wherein the three-dimensional model is displayed behind the translucent surface in a distorted form based on the rendered distortion effect. For example, FIG. 1 shows a computer display 100 displaying a three-dimensional model 105 that comprises a translucent surface.

FIG. 7 shows that an additional or alternative method in accordance with an implementation of the present invention for creating visual distortions through translucent structures can comprise an act 700 of rendering a three-dimensional model. Act 700 can include rendering a three-dimensional model of a layout of a design space within an architectural design environment. For example, FIG. 2 shows a scene 250 from a three-dimensional model 105 that has been rendered.

In addition, FIG. 7 shows that the method can comprise an act 710 of identifying a translucent surface. Act 710 can include identifying a translucent surface within the three-dimensional model. For example, FIG. 5A shows a portion of the three-dimensional model—a view of a top of a chair 205—has been identified as being a translucent surface.

Furthermore, FIG. 7 shows that the method can comprise an act 720 of performing a visual distortion effect. Act 720 includes performing a distortion effect on the translucent surface, wherein performing the distortion effect comprises performing acts 730 and 740. For example, FIGS. 2 and 5B shows a distortion effect applied to the top of a chair 205.

Additionally, FIG. 7 shows that the method can comprise an act 730 of masking a portion of the three-dimensional model 105. Act 730 can include masking a portion of the three-dimensional model from the translucent surface. For example, FIG. 5A shows a portion 500 of the three-dimensional model 105 masked from the translucent surface.

Further, FIG. 7 shows that the method can comprise an act 740 of blurring one or more pixels. Act 740 can include blurring one or more of the pixels of the translucent surface. For example, FIG. 5B shows the translucent surface 200 with one or more blurred pixels.

Further still, FIG. 7 shows that the method can comprise act 750 of displaying the three-dimensional model. Act 750 can include displaying to a user the three-dimensional model, including the translucent surface. For example, FIG. 1 shows a computer display 100 displaying a three-dimensional model 105 that comprises a translucent surface.

Accordingly, FIGS. 1-7 provide a number of components, schematics, and mechanisms for creating translucent surfaces within a design software application 140. One will appreciate that the concepts described herein can provide a number of advantages related to the selection of materials and the layout of buildings that have been modeled using the present invention. For example, at least one implementation of the present invention allows a user a much greater sense of realism when attempting to visually determine the effect that a variety of translucent materials can have on a particular room. The benefits provided by the software described herein enable a designer to, for example, simply and efficiently select a proper amount of frosting to apply to a glass surface that is being inset into the door of a doctor's examination room. In this case, the frosted glass surface should provide sufficient privacy but still allow light to enter the room through the surface. The inventive software components described herein would enable the designer to accurately select the correct level of frosting without unnecessary delays and re-ordering of materials.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computerized architectural design environment in which a design program is loaded into memory and processed at a central processing unit, a computer-implemented method for creating translucent surfaces within a three-dimensional model, the method comprising:
   receiving a surface placement instruction that comprises a computer instruction for placing a translucent surface within a three-dimensional model, wherein:
      the translucent surface is selected from a list of defined surfaces that each comprise a particular type of translucent material, and
      each particular type of translucent material is associated with pre-defined translucency characteristics;
   rendering the three-dimensional model of a layout of a design space within an architectural design environment;
   identifying a position of a user perspective within the three-dimensional model;
   identifying a first portion of the three-dimensional model that is positioned on an opposite side of the translucent surface from the user perspective within the three-dimensional model;
   rendering a visual distortion effect for the identified first portion of the three-dimensional model, wherein the visual distortion effect comprises a distortion algorithm that receives input variables from the pre-defined translucency characteristics; and
   displaying on a display device the three-dimensional model comprising the translucent surface, wherein the three-dimensional model is displayed behind the translucent surface in a distorted form based on the rendered distortion effect.

2. The method as recited in claim 1, wherein rendering a visual distortion effect for the identified first portion of the three-dimensional model comprises:
   identifying a target pixel that is to be distorted; and
   randomly selecting one or more other pixels to blur into the target pixel.

3. The method as recited in claim 2, further comprising:
   masking a second portion of the three-dimensional model that surrounds the translucent surface.

4. The method as recited in claim 3, further comprising:
   determining whether one of the randomly selected one or more other pixels originated from the masked second portion of the three-dimensional model; and
   excluding the one of the selected one or more other pixels from being blurred into the target pixel.

5. The method as recited in claim 3, wherein masking the second portion of the three-dimensional model comprises:
   assigning a specific attribute to the second portion of the three-dimensional model.

6. The method as recited in claim 5, wherein assigning a specific attribute to the second portion of the three-dimensional model comprises rendering the second portion in a specific uniform color.

7. The method as recited in claim 2, further comprising:
identifying a material type associated with the translucent surface;
identifying an attribute associated with the material type; and
adjusting the visual distortion effect based upon the attribute.

8. The method as recited in claim 7, further comprising:
identifying a color that is associated with the material type; and
biasing the visual distortion effect to incorporate the color.

9. The method as recited in claim 7, further comprising:
identifying a magnitude of translucence that is associated with the material type; and
biasing the visual distortion effect to incorporate the magnitude of translucence.

10. The method as recited in claim 1, further comprising:
loading the first portion of the three-dimensional model into a stencil buffer, wherein the first portion is not initially rendered.

11. In a computerized architectural design environment in which a design program is loaded into memory and processed at a central processing unit, a computer-implemented method for creating visual distortions effects through translucent structures, the method comprising:
receiving a surface placement instruction that comprises a computer instruction for placing a translucent surface within a three-dimensional model, wherein:
the translucent surface is selected from a list of defined surfaces that each comprise a particular type of translucent material, and
each particular type of translucent material is associated with pre-defined translucency characteristics;
rendering the three-dimensional model of a layout of a design space within an architectural design environment;
performing a distortion effect on the translucent surface, wherein performing the distortion effect comprises:
masking at least a portion of the three-dimensional model from the translucent surface; and
blurring with a distortion algorithm one or more of the pixels of the translucent surface, wherein the distortion algorithm receives input variables from the pre-defined translucency characteristics; and
displaying to a user the three-dimensional model, including the translucent surface.

12. The method as recited in claim 11, wherein blurring one or more of the pixels of the translucent surface comprises:
identifying a target pixel that is to be distorted; and
selecting one or more other pixels to blur into the target pixel.

13. The method as recited in claim 12, further comprising:
determining whether one of the selected one or more other pixels originated from the masked portion of the three-dimensional model; and
excluding the one of the selected one or more other pixels from being blurred into the target pixel.

14. The method as recited in claim 13, wherein masking the portion of the three-dimensional model from the translucent surface comprises:
assigning a specific attribute to the masked portion of the three-dimensional model.

15. The method as recited in claim 14, wherein assigning a specific attribute to the masked portion of the three-dimensional model comprises rendering the masked portion in a specific uniform color.

16. The method as recited in claim 11,
wherein the one or more translucency attributes associated with the translucent material comprise a color.

17. The method as recited in claim 16, further comprising biasing the distortion effect to incorporate the color.

18. The method as recited in claim 16,
wherein the one or more translucency attributes associated with the translucent material comprise a magnitude of translucence.

19. The method as recited in claim 11, further comprising:
loading the translucent surface into a stencil buffer, wherein the translucent surface is not initially rendered.

20. A computer program product for use at a computer system, the computer program product for implementing a method for creating translucent surfaces within a three-dimensional model, the computer program product comprising one or more computer hardware storage media having stored thereon computer-executable instructions that, when executed at a processor, cause the computer system to perform the method, including the following:
receiving a surface placement instruction that comprises a computer instruction for placing a translucent surface within a three-dimensional model, wherein:
the translucent surface is selected from a list of defined surfaces that each comprise a particular type of translucent material, and
each particular type of translucent material is associated with pre-defined translucency characteristics;
rendering the three-dimensional model of a layout of a design space within an architectural design environment;
identifying a position of a user perspective within the three-dimensional model;
identifying a first portion of the three-dimensional model that is positioned on an opposite side of the translucent surface from the user perspective within the three-dimensional model;
rendering a visual distortion effect for the identified first portion of the three-dimensional model, wherein the visual distortion effect comprises a distortion algorithm that receives input variables from the pre-defined translucency characteristics; and
displaying on a display device the three-dimensional model comprising the translucent surface, wherein the three-dimensional model is displayed behind the translucent surface in a distorted form based on the rendered distortion effect.

* * * * *